United States Patent Office 3,470,298
Patented Sept. 30, 1969

3,470,298
TOPICAL ANTI-INFLAMMATORY COMPOSITION CONTAINING (INDAZOLE-3-YL)-OXYALKANOIC ACIDS
Giuseppe Palazzo, Rome, Italy, assignor to Aziende Chimiche Riunite Agelini, Francesco A.C.R.A.F. S.p.A., Rome, Italy, a corporation of Italy
No Drawing. Application May 24, 1968, Ser. No. 731,723, which is a continuation-in-part of application Ser. No. 606,594, Jan. 3, 1967. Divided and this application Jan. 29, 1969, Ser. No. 795,051
Int. Cl. A61k 23/00, 27/00
U.S. Cl. 424—273       6 Claims

ABSTRACT OF THE DISCLOSURE

Cosmetic compositions contain as anti-inflammatory agents (indazole-3-yl)-oxyalkanoic acids and non-toxic salts thereof.

Related applications

This application is a division of application Ser. No. 731,723, filed May 24, 1968 which, in turn, is a continuation-in-part of application Ser. No. 606,594, filed Jan. 3, 1967, now abandoned.

Background of the invention

This invention has to do with compounds having pharmacological properties. More specifically, it has to do with (indazole-3-yl)-oxyalkanoic acids and non-toxic salts thereof, possessed of such properties.

In recent years, a variety of steroids have been found to be beneficial as anti-inflammatory agents. However, such compounds also have some undesirable side effects. There has been a need, therefore, for non-steroidal anti-inflammatory agents. This invention is concerned with such agents.

Summary of the invention

In accordance with the present invention, there are provided (indazole-3-yl)-oxyalkanoic acids and the pharmacologically acceptable salts thereof. The invention is also concerned with processes for forming said acids and salts thereof.

The (indazole-3-yl)-oxyalkanoic acids are represented by the following general formula:

(I)
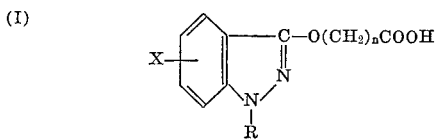

wherein:

X=H, Cl, OCH$_3$, NO$_2$, NH—COCH$_3$, NH$_2$
R=hydrogen, phenyl or benzyl; phenyl and benzyl may be substituted with methyl, methoxy, halogens, trifluoromethyl, and dimethylsulfamide, and
n=1 or 2.

Compounds of general Formula I can be prepared from the corresponding 3-oxy-indazoles by reacting an alkali or alkaline earth salt of the same 3-oxy-indazoles of general Formula II, with a halogen compound of general Formula III, according to the following reaction scheme

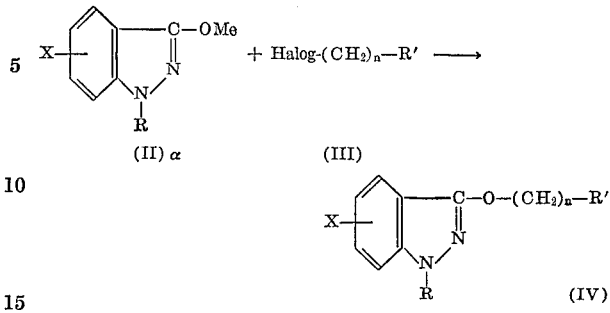

α=Journal of Medicinal Chemistry 9, 38 (1966).

wherein X, R and $n$ are as defined above, Me represents an alkaline metal, R' represents a carboxyl, carbethoxy, nitrile or carboxyamide group, and Halog represents halogen (preferably chlorine or bromine). The reaction is suitably carried out in aqueous solution at elevated temperature (e.g. 80–100° C.) for 30–90 minutes.

When R' has a meaning other than that of carboxyl, the reaction scheme illustrated above is followed by a hydrolysis of the ester, nitrile or amide of general Formula IV. Hydrolysis conditions are illustrated below in Examples II–IV. Thus, conventional hydrolysis conditions can be employed. For example, an alkyl-halogen-acetate can be reacted with a sodium or potassium salt of a 3-oxy-indazole to form the corresponding indazole-3-oxyacetic ester. The ester is purified by distillation and is subsequently hydrolyzed to the corresponding acid. Similarly, chloroacetonitrile can be reacted with a sodium or potassium salt of 3-oxy-indazole and the resulting nitrile can then be hydrolyzed.

In the specific case of compounds of general Formula I wherein $n$ is 2, the compounds can be prepared by reacting alkaline salts of general Formula II with propiolactone, in aqueous medium at 50–100° C. Typical conditions are illustrated below in Example V.

Compounds of general Formula I wherein R does not represent phenyl or substituted phenyl are also obtainable from the corresponding (indazole-3-yl)-oxyalkanoic derivatives devoid of substituents in 1-position, by reacting the same derivatives with benzyl halides, optionally substituted as indicated above, in an alkaline aqueous medium. For example, the acid can be reacted in water with 1 gram equivalent of the benzyl halide and 2.5 gram equivalents of alkali, such as NaOH, at elevated temperatures (50° C.) for several hours (2–3).

Compounds of general Formula I wherein X represents a nitro group can be formed by nitration of the corresponding compounds wherein X represents hydrogen. In this nitration process the nitro-group enters the 5-position of the indazole ring. Correspondingly, the nitro group can be reduced to an amino group, by employing suitable reduction conditions for heterocyclic compounds. Nitration and reduction conditions are illustrated below in Examples VI and VII.

With respect to the reaction scheme illustrated above, halogen compounds (III) wherein R' is a carboxyl group are reacted with the alkali metal salts (preferably the sodium salt) of 3-oxyindazoles in aqueous solution, at temperatures and for a time depending on the reactions, which vary, however, in general from 20 to 80° C. and for 1–5 hours. Another suitable method involves reacting an alkali metal salt of 3-oxy-indazole with a sodium salt of a chloroalkanoic acid in toluene or xylene suspension at the boiling point for 1–5 hours. When R' represents a carbalkoxy, nitrile or carboxyamide group, reaction with a compound (II) is carried out in an inert solvent (e.g., dioxane). Subsequent hydrolysis to a corresponding carboxyl derivative can be accomplished by using conventional hydrolysis conditions.

In the reactions mentioned above, in addition to compounds of Formulae I and IV, compounds corresponding to Formula V can be formed (V)

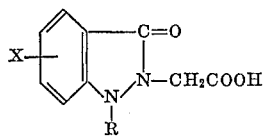

wherein the acetic acid radical (—CH$_2$COOH) is bonded to the nitrogen in position 2 rather than to the oxygen. By suitable selection of reaction conditions, it is possible to obtain compounds of either Formulae I or IV in substantially pure state and in yields of 80% by weight. Nonpolar solvents favour formation of compounds of (I) and (IV); polar solvents favour formation of compounds of (V).

Compounds represented by Formula I are distinguished from compounds represented by Formula II by means of the IR spectrum. They show an intense band, at about 1530 cm.$^{-1}$, which is lacking in compounds (V), whereas they are devoid of a band at about 1630 cm.$^{-1}$, which represents the most intense band of the spectre of compounds (V). Melting points of compounds (I) are generally lower than the melting points of the corresponding compounds (V).

The following methods were employed for pharmacological investigation of the compounds of this invention.

Acute toxicity was determined on a mouse intraperitoneally by recording the mortality occuring within five days after treatment. A series of observations on the behavious was then carried out by utilizing the Irvin method (Pharmacological Techniques in Drug Evaluation, Year Book; Medical Publishers, Chicago, 1964; pp. 36–54). Neurovegetative effects were investigated "in vitro" by recording the response of a guinea pig's isolated intestine stimulated with acetylcholine, histamine and dimethyl phenyl pterazinium iodide (DMPP), as well as "in vivo" by recording the arterial pressure and the response to adrenaline injection and the vagus stimulation in a cat anaesthetized with chloralose (70 mg./kg. i.p.). Analgesic action was then investigated according to the method of Siegmund et al. (1957).

Anti-edema action on a mouse was investigated according to the method of Winter et al. (1962) and the antigranuloma action according to the method of Maier et al. (1950).

The action of said derivatives on the serum albumin denaturation obtained by means of heat (Mizushima, Acta Rheum. Scand. 9, 33, 1963; Mizushima and Suzuki, Arch. int. Pharmacodyn. 157, 115, 1965; Del Basso and Silvestrini, Biochim, XV, 198, 1966).

The local anti-inflammatory action was investigated by utilizing the method of the application of the products on the granuloma (Winter et al., 1962) and by applying the products in a 3% Vaseline suspension on the wheal obtained through the method of Parrat and West (1958).

The local tolerance capacity was determined either by application on the rat of cutaneous tissue or by means of subcutaneous injection in the rat.

Compounds of Formula I possess a very low acute toxicity which is of about 300 mg./kg. i.p., with the exception of the 1-o.chloro-benzyl-indazole-3-oxyacetic acid which is about twice as toxic.

The effects on the behaviour involve sedation at relatively high doses (50 or 100 mg./kg. i.p.); prostration and convulsions at sub-toxic doses. No neurovegetative effects were observed; neither in these tests nor in those performed by utilizing the isolated organs and the pressor responses on the cat.

No analgesic action was observed by the test of Siegmund et al., with the exception of the 1-m.chlorobenzyl-indazole-3-oxyacetic acid which displays a significant effect at a dosage of 10 mg./kg. s.c.

The anti-edema is lacking and also the action on the granuloma is poor or absent.

On the contrary, compounds (I) possess a contact antiinflammatory action which is comparable with or higher than the action of cortisone. Indeed, they not only inhibit the granuloma growth when applied directly on the cotton pellet, but also reduce distinctly the local inflammatory reactions when applied as 3% ointment.

These results are particularly interesting since so far as we know it is the first time that an anti-inflammatory local action on the part of substances not on the steroid type is described. A concentration capable of producing irritation phenomena is 20 to 50 times higher than the lowest active concentration.

The local anti-inflammatory action is most probably connected with the capacity of said substances to protect the serum albumin against the heat denaturation. It is known, however, that in the course of the inflammatory process a denaturation of the proteins occurs which, in its turn, is responsible for the many phenomena characterizing the inflammatory process.

On the other hand, since all the known antirheumatic drugs are able to inhibit the albumin heat denaturation, said substances may be considered as being able to display a therapeutical activity in the rheumatic diseases wherein the presence indeed occurs in the blood of anomalous proteins, analogous to the ones which are formed by heating the albumin "in vitro."

SPECIFIC EMBODIMENTS

EXAMPLE I 1-p.chlorobenzyl-indazole-3-oxyacetic acid

An aqueous solution of potassium salt of 1-p.chlorobenzyl-3-oxy-indazole is prepared by dissolving 25.8 g. of the indazole in 200 ml. of a 14% KOH solution. The aqueous solution is heated on water-bath and, with stirring, 35 g. of monobromoacetic acid are added at once. Stirring and heating are continued until the pH of the solution is about 7, which happens within about half an hour. After cooling, the solution is filtered off from any possible small undissolved residue, and then acidified with dilute HCl. The resulting precipitate is collected, washed with water and dissolved in an aqueous 10% solution of K$_2$CO$_3$. Any relatively small undissolved residue is filtered off from the solution which is formed; it is then acidified again with dilute HCl. The 1-p.chlorobenzyl-indazole-3-oxyacetic acid which is formed is now dissolved in a slight excess of an aqueous saturated solution of sodium acid carbonate and it is precipitated again by acidifying. It is washed with water and crystallized from alcohol at 95°. The substance has a melting point of 117° C. In the crystallization waters, small amounts of the isomer 1-p.chlorobenzyl-indazole-3-one-2-acetic acid appear.

EXAMPLE II 1-m.chlorobenzyl-indazole-3-oxyacetic acid 25.8 g. of 1-m.chlorobenzyl - 3 - oxy-indazole are dissolved in a sodium methylate solution prepared from 2.3 g. of sodium. By removing solvent, the sodium salt of 1-m.chlorobenzyl - 3 - oxy-indazole is left, which is mixed with 16.7 g. of ethyl bromoacetate and suspended in 280 ml. of 1,2-dimethoxy-ethane. The resulting reaction mixture is stirred and heated for 3 hours with stirring at 100° C. After cooling, a precipitate is filtered off and the resulting filtrate is evaporated to dryness under reduced pressure. The residue is taken up again with ether and is thoroughly washed first with very diluted aqueous NaOH solution, then with water. It is dried on $Na_2SO_4$ and the solvent is removed. Distillation under reduced pressure affords a mixture of strongly prevailing 1-m. chlorobenzyl-indazole - 3 - oxyacetic acid ethyl ester, and of 1-m.chlorobenzyl - 3 - one - 2 - acetic acid ethyl ester boiling at 218° C./1.5 torr.

*Analysis.*—Calculated for $C_{18}H_{17}ClN_2O_3$: C, 62.70; H, 4.97; N, 8.13. Found: C, 62.80; H, 5.19; N, 8.39.

Hydrolysis is carried out by treating the ester product with two equivalents of NaOH dissolved in a water volume equal to twenty times the ester weight and stirring at 90° C. until complete solution results. After about one hour, the reaction is completed; the reaction mixture is cooled and is acidified with dilute HCl. A precipitate is collected. The precipitate is purified by dissolving it in 10% $Na_2CO_3$ and then removing a small amount of insoluble residue from the resulting alkaline solution. Upon acidification, a mixture of two isomeric acids is obtained, wherein however 1-m.chlorobenzyl-indazole - 3 - oxyacetic acid prevails. For the purification, advantage is taken of the fact that 1-m.chlorobenzyl - 3 - one - 2 - acetic acid has a very low solubility in ethyl alcohol. Therefore, by treating 1 part by weight of the mixture with 5 parts by volume of ethyl alcohol, only 1 - m.chlorobenzyl-indazole-3-oxyacetic acid is extracted, which is finally crystallized from hexane. It has a melting point of 109° C.

EXAMPLE III 1-benzyl-indazole-3-oxyacetic acid 11 g. of the sodium salt of 1 - benzyl-3-oxy-indazole are dissolved in 70 ml. of absolute ethanol by heating the resulting solution to boiling and stirring. 3.5 g. of chloroacetonitrile dissolved in 5 ml. of absolute ethanol are then added within 2–3 minutes and after 10 minutes a further portion of 1.7 g. of chloroacetonitrile are added. The reaction is finally brought to completion with an additional 45 minutes of boiling. The reaction mixture is allowed to cool at room temperature and is then filtered. The alcohol solution is evaporated to dryness under reduced pressure; the resulting residue is taken up again with ether and the ether solution is washed in sequence with dilute HCl, water, NaOH and water. The solution is dried on $Na_2SO_4$ and then the solvent is removed. The residue consists of (1 - benzyl-indazole - 3) - oxyacetonitrile which is crystallized from methanol. It has a melting point of 93° C.

*Analysis.*—Calculated for $C_{16}H_{13}N_3O$: C, 72.98; H, 4.98; N, 15.96. Found: C, 73.21; H, 5.25; N, 16.03.

1 g. of the (1-benzyl-indazole-3)oxyacetonitrile is pulverized and is added with stirring to 5 ml. concentrated HCl. By heating on a boiling water bath for 2–3 minutes, the nitrile product melts and soon thereafter solidifies. The precipitate is cooled, then filtered and washed well in a mortar with water. After dissolution in 10% $Na_2CO_3$, it is precipitated again with dilute HCl. After crystallization from ethanol, 1-benzyl-indazole-3-oxyacetic acid is obtained. It has a melting point of 160° C.

EXAMPLE IV (1-benzyl-indazole-3-yl)-oxyacetic acid (a) 246 g. sodium salt of 1-benzyl-3-oxy-indazole and 131 g. chloroacetamide are suspended in 1 liter of dioxane and the resulting suspension is refluxed for two hours. The solvent (dioxane) is removed under reduced pressure and the residue is crystallized from alcohol. Thus (1-benzyl-indazole-3-yl)-oxyacetic acid amide is obtained. It has a melting point of 135°–7° C.

(b) 155 g. of the amide are refluxed for two hours with a mixture of 300 ml. dioxane and 300 ml. concentrated hydrochloric acid. After cooling, 3 l. of water are added. An oil precipitates which solidifies immediately. It is crystallized from acetone, after hot filtering from a small amount of undissolved 1-benzyl-3-oxy-indazole. The product is (1-benzylindazole-3-yl)-oxyacetic acid, which melts at 160° C.

EXAMPLE V

β-(1-benzyl-indazole-3-yl)-oxypropionic acid 25 g. sodium salt of 1-benzyl-3-oxy-indazole are dissolved in a solution of 3 g. NaOH in 75 ml. water. The resulting solution is heated to 65°–70° C. and 11.7 g. propiolactone are added slowly thereto while stirring. At the end of the addition, the solution is further heated for 15 minutes, cooled to room temperature, acidified, and extracted with ether. From the ethereal solution, a small amount of unreacted 1-benzyl-3-oxy-indazole precipitates. The product is β-(1-benzyl-indazole-3-yl)-oxypropionic acid; this is filtered and extracted with 5% bicarbonate solution, precipitating it again by acidification with HCl. It is crystallized from benzene. 15 g. of the acid are so obtained. It has a melting point of 135° C.

EXAMPLE VI (1-benzyl-5-nitro-indazole-3-yl)-oxyacetic acid 20 g. of (1-benzyl-indazole-3-yl)-oxyacetic acid are suspended in 200 ml. acetic anhydride. The suspension is cooled at 0° C. and 3.5 ml. $HNO_3$ (d.=1.52) are slowly dropped therein. Stirring is continued for three hours, that is, to complete solubilization and subsequent precipitation of the resulting nitroderivative. It is filtered, washed wth water and crystallized from benzene. It has a melting point of 155° C.

EXAMPLE VII (5-acetamino-1-benzyl-indazole-3-yl)-oxyacetic acid (a) To a solution heated to 80° C. on a water bath, and stirred, of 30 g. $SnCl_2.H_2O$ in 30 cc. of concentrated HCl, 14 g. (1-benzyl-5-nitro-indazole-3-yl)-oxyacetic acid are added in portions. This oxyacetic acid goes into solution to then become partially insoluble. At the end of the addition, the desired reduction reaction is completed by heating for 15 minutes at 80° C. Then, the reaction mixtur eis cooled and a precipitate which is formed is separated. By crystallization of this precipitate from an alcohol-ether mixture, the (5-amino-1-benzyl-indaxole-3-yl)-oxyacetic acid hydrochloride is obtained.

Hydrochloric mother liquors are diluted with water and brought to a pH of 8; a precipitate of inorganic salt is separated, while the alkaline solution is neutralized to a pH of 6 with acetic acid. The precipitate formed is filtered off, washed and crystallized from dioxane-methanol (1:1). This product is 5-amino-1-benzyl-indazole-3-yl)-oxyacetic acid; it melts at 217° C. (decomp.)

(b) 6 g. (5 - amino-1-benzyl-indazole-3-yl)-oxyacetic acid in 24 ml. acetic anhydride are heated for 15 minutes at 110° C. The resulting mixture is poured in 100 ml. $H_2O$ and the solution obtained is made alkaline slowly with aqueous $Na_2CO_3$. The alkaline solution is clarified with charcoal, then filtered, and acidified with dilute HCl. The precipitate which forms is filtered, washed with $H_2O$ to neutrality and crystallized from ethanol.

The product so obtained is (5-acetamino-1-benzyl-indazole-3-yl)-oxyacetic acid which melts at 238° C.

EXAMPLE VIII

[1-(2,6-dimethyl-3-dimethylsulfamoyl)-phenyl-indazole-3-yl]-oxyacetic acid 6 g. of N-(2,6-dimethyl-3-dimethylsulfamoyl)-phenyl-anthranilic acid are dissolved in 42 ml. acetic acid, followed by 6 g. $NaNO_2$. The resulting solution is allowed to stand overnight. It is poured into water and allowed to digest until the precipitate which forms takes on a solid appearance. It is filtered, washed with water and then washed repeatedly with benzene. The N-(2,6-dimethyl-3-dimethylsulfamoyl) - phenyl - N-nitroso-anthranilic acid thus obtained has a melting point of 139° C. (decomp.).

5.7 g. zinc powder are suspended in 22 ml. water. While stirring and keeping the temperature between 10° and 20° C., a solution of 10 g. of the nitroso-derivative in 100 ml. acetic acid is slowly introduced. At the end of the addition, the resulting solution is further stirred for about 2 hours, then heated for 10 minutes at 80° C. and poured into 150 ml. water. The pH of the solution is brought to 6 with solid sodium carbonate and the resulting precipitate is filtered off. 1-(2,6-dimethyl-3-dimethylsulfamoyl)-phenyl-3-oxy-indazole is crystallized from alcohol. It melts at 182° C.

The oxy-indazole is converted to a sodium salt with the calculated amount of sodium methylate. An equivalent of this salt, 1.1 equivalents of dry sodium chloroacetate and 11 parts of xylene are heated to the boiling point for 4–5 hours. The resulting mixture is cooled and extracted with 1% NaOH. It is acidified with hydrochloric acid and extracted with ether. From the ethereal solution [1-(2,6-dimethyl - 3 - dimethylsulfamoyl)-phenyl-indazole-3-yl]-oxyacetic acid is extracted with 7% sodium bicarbonate. By acidifying resulting bicarbonate extract, the substantially pure substance precipitates and can be crystallized from ligroin. It has a melting point of 120–1° C.

EXAMPLE IX

A quantity of the acid of Example III is dissolved in aqueous sodium hydroxide containing a stoichiometric amount of sodium. The resulting solution is evaporated to dryness under vacuum. The sodium salt so obtained slowly decomposes rather than exhibiting a sharp melting point.

EXAMPLE X

Zinc salts

To an aqueous saturated solution of the sodium salt of 1-benzyl-indazole-3-yl-oxyacetic acid (as prepared in Example IX), an equimolecular amount of zinc chloride dissolved in water is added. An abundant, colorless precipitate is formed and is isolated by filtration. The precipitate is then dissolved in acetone and is precipitated again with water.

The dried salt shows a melting point of 110° C. and its analysis corresponds to $(C_{16}H_{13}N_2O_3)_2Zn$.

Using the same procedure, the following salts were also prepared from the acid described in Example III:

$Pb(C_{16}H_{13}N_2O_3)_2$ M.P. 170–173°
$Al(C_{16}H_{13}N_2O_3)_3$ M.P. 160°
$Cd(C_{16}H_{13}N_2O_3)_2$ M.P. 135–140°
$Ca(C_{16}H_{13}N_2O_3)_2$ M.P. 126–130°
$Sn(C_{16}H_{13}N_2O_3)_2$ M.P. 80–90°
$Ag(C_{16}H_{13}N_2O_3)$ M.P. 207°
$Bi(C_{16}H_{13}N_2O_3)_3$ M.P. 156°

EXAMPLE XI

By following the procedure of Example IX, but substituting ammonium hydroxide or an organic amine for the aqueous sodium hydroxide, the following salts were obtained from the acid described in Example III:

ammonium salt, $NH_4.C_{16}H_{13}N_2O_3$, M.P. 155°;
N-hydroxyethylmorpholine salt, $C_6H_{13}NO_2.C_{16}H_{14}N_2O_3$, M.P. 95–97°;
piperazine salt, $C_4H_{10}N_2.(C_{16}H_{14}N_2O_3)_2$, M.P. 175°;
triethanolamine salt, $C_6H_{15}NO_3.C_{16}H_{14}N_2O_3$, M.P. 87–89°;
ethylendiamine salt, $C_2H_6N_2.C_{16}H_{14}N_2O_3.H_2O$;
morpholine salt, $C_4H_9NO.C_{16}H_{14}N_2O_3$, M.P. 137°;
diethanolamine salt, $C_4H_{11}NO_2.C_{16}H_{14}N_2O_3$, M.P. 99°;

and the following salts from the acid described in Example II:

diisopropylamine salt, $C_6H_{15}N.C_{16}H_{13}ClN_2O_3$, M.P. 109°;
diethanolamine salt, $C_4H_{11}NO_2.C_{16}H_{13}ClN_2O_3$, M.P. 106°.

According to one or more of the above-described methods, the following compounds have been prepared:

[1-(2,6-dimethylphenyl)-indazole - 3 - yl] - oxyacetic acid M.P. 130°
[1-(2,3-dimethylphenyl)-indazole - 3 - yl] - oxyacetic acid M.P. 142°
1-phenyl-indazole-3-oxyacetic acid M.P. 164°
1-m.chlorophenyl-indazole-3-oxyacetic acid M.P. 148°

(the novel intermediate 1-m.chlorophenyl-3-oxy-indazole has a melting point of 240°)

β-(1-phenyl-indazole-3-yl)-oxypropionic acid M.P. 131°
β-(indazole-3-yl)-oxypropionic acid M.P. 179°
β-(1-p.fluorophenyl-indazole-3-yl)-oxypropionic acid M.P. 150.2°

(the novel intermediate 1-p.fluorophenyl-3-oxyindazole has a melting point of M.P. 250°)

1-O.chlorobenzyl-indazole-3-oxyacetic acid M.P. 156°
β-(1-m.bromophenyl - indazole - 3 - yl)oxypropionic acid M.P. 89° the novel intermediate 1-m.bromophenyl-3-oxyindazole has a melting point of M.P. 242°)

β-(5-methoxy-indazole-3-yl)-oxypropionic acid M.P. 184°
(1-m.trifluoromethylphenyl-indazole-3-yl)-oxyacetic acid M.P. 157°

(the novel intermediate 1-m.bromophenyl-3-oxyindazole has a melting point of 203° C.)
(5-chloro-1-benzyl-indazole-3 - yl) - oxyacetic acid M.P. 158°
β-[1-(2,6-dimethyl)-phenyl-indazole-3-yl] - oxypropionic acid M.P. 133°
(5-amino-1-benzyl-indazole-3 - yl) - oxyacetic acid hydrochloride M.P. 230°
1-benzyl-6-chlor-indazole-3-oxyacetic acid M.P. 157° C.

The invention is illustrated further by the formulations, including ointments and a lotion, shown in the following examples.

EXAMPLE XII

An ointment containing from 1 to 3% of 1-benzyl-indazole-3-yl-oxyacetic acid in 100 ml. of an excipient is formulated as follows:

|  | G. |
|---|---|
| Petroleum jelly | 40 |
| Paraffin oil | 20 |
| Cetyl alcohol | 2.5 |
| Stearyl alcohol | 2.5 |
| White wax | 5 |
| Sorbitan sesquioleate | 10 |
| Methyl p-oxybenzoate | 0.18 |
| Propyl p-oxybenzoate | 0.02 |
| Water to make 100 g. | |

EXAMPLE XIII

An ointment containing from 1 to 3% of 1-benzylindazole-3-yl-oxyacetic acid sodium salt in 100 ml. of an excipient is formulated as follows:

|  | G. |
|---|---|
| Polyoxyethylene sorbitan monostearate | 4.4 |
| Polyoxyethylene monostearate | 0.6 |
| Stearic acid | 9 |
| Paraffin oil | 10 |
| Isopropyl myristate | 2 |
| Cetyl stearyl alcohol | 4.13 |
| Glycerol | 6 |
| Nipagine (methyl p-oxybenzoate) | 0.18 |
| Nipasol (propyl p-oxybenzoate) | 0.02 |
| Water to make 100 g. | |

EXAMPLE XIV

A lotion is formulated as follows:

|  | G. |
|---|---|
| 1-benzyl-indazole-3-yl-oxyacetic acid sodium salt | 1 |
| Cetyl alcohol | 1.9 |

| | G. |
|---|---|
| Paraffin oil | 2.5 |
| Sodium lauryl sulfonate | 1 |
| Fluid silicone 200/350 MS | 5 |
| Glycerol | 5 |
| Nipagine | 0.18 |
| Nipasol | 0.02 |

Water to make 100 g.

EXAMPLE XV

An ointment is formulated as follows:

| | G. |
|---|---|
| 1-benzyl-indazole-3-yl-oxyacetic acid | 3 |
| Neomycin sulfate | 0.5 |
| Petroleum jelly | 40 |
| Paraffin oil | 20 |
| Cetyl alcohol | 2.5 |
| Stearyl alcohol | 2.5 |
| White wax | 5 |
| Sorbitan sesquioleate | 10 |
| Methyl p-oxybenzoate | 0.18 |
| Propyl p-oxybenzoate | 0.02 |

Water to make 100 g.

The compounds of this invention can be used in pharmacological compositions and in cosmetic and toiletry preparations including beauty creams, beauty lotions, sunburn lotions and shampoos, dentifrices and mouth washes.

The present invention embraces all salts, including acid-addition and metal salts, of the (indazole-3-yl) oxyalkanoic acids. The well-known procedures for preparing salts are applicable here and are illustratable in the examples set forth above. Such salts can be formed with both pharmaceutically acceptable and pharmaceutically unacceptable acids, metals and organic bases. By "pharmaceutically acceptable' is meant those salt-forming acids, metals and bases which do not substantially increase the toxicity of the said oxyalkanoic acids.

The pharmaceutically accepted acid addition salts include salts of mineral acids such as hydrochloric, hydriodic, hydrobromic, phosphoric, metaphosphoric, nitric and sulfuric, as well as salts of organic acids such as tartaric, citric, malic, benzoic, glycollic, gluconic, gulonic, succinic, and aryl-sulfonic, e.g. p-toluene sulfonic acids. The pharmaceutically unacceptable acid addition salts while not useful for therapy, are valuable for isolation and purification of the new oxyalkanoic acids. Further, they are useful for the preparation of pharmaceutically acceptable salts. Of this group, the more common salts include those formed with hydrofluoric and perchloric acids. The acid salts are formed when X is $NH_2$.

Whereas all metal salts of the novel acids described above may be prepared and are useful for various purposes, the pharmaceutically acceptable metal salts are particularly valuable because of their utility in therapy. The pharmaceutically acceptable metals include sodium, potassium and alkaline earth metals of atomic number up to and including 20, i.e., magnesium and calcium, and additionally, aluminum, zinc, iron, manganese, and cadmium.

The pharmaceutically unacceptable metal salts embrace most commonly salts of lithium and of alkaline earth metals of atomic number greater than 20, i.e., barium and strontium, which are useful for isolation and purification of the oxyalkanoic acids.

Pharmaceutically acceptable salts of organic amines and the oxyalkanoic acids are illustrated by morpholine salts. And pharmaceutically unacceptable salts are illustrated by o-, m- and p-toluidine salts which can be used for isolation and purification purposes.

The following are additional examples of non-pharmaceutical compositions:

EXAMPLE XVI

Hand cream (O/W type)

100 g. contain:

| | G. |
|---|---|
| Lanolin alcohols | 4 |
| Acetylated lanolin | 2 |
| Stearin | 6 |
| Self-emulsifying glyceryl monostearate | 12 |
| Liquid paraffin | 2 |
| Nipagine | 0.18 |
| Nipasol | 0.02 |
| Triethanolamine | 1 |
| 1-benzyl-indazole-3-yl-oxyacetic acid | 1 |
| Perfume, q.s. | |
| Water | 72.80 |

Soft white cream, easily absorbed by hands, pH=7.2.

EXAMPLE XVII

Beauty cream (O/W type)

100 g. contain:

| | G. |
|---|---|
| Acetylated lanolin alcohols | 10 |
| Diethylene glycol monostearate | 2 |
| Acetylated lanolin | 2 |
| Stearic acid | 2 |
| Cetyl alcohol | 2.50 |
| Nipagine | 0.18 |
| Nipasol | 0.02 |
| Triethanolamine | 1 |
| 1-benzyl-indazole-3-yl-oxyacetic acid | 1 |
| Perfume, q.s. | |
| Water | 79.30 |

Ivory-white soft and emollient cream, pH = 7.2.

EXAMPLE XVIII

Hair lotion (O/W emulsion)

100 ml. contain:

| | G. |
|---|---|
| Cetyl alcohol | 1.90 |
| Paraffin oil | 2.50 |
| Fluid silicone (dimethylpolysiloxane) viscosity 200/350 centistokes | 5 |
| Sodium lauryl sulfate | 1 |
| Glycerol | 5 |
| Nipagine | 0.18 |
| Nipasol | 0.02 |
| 1-benzyl-indazole-3-yl-oxyacetic acid sodium salt | 1 |

Water to make 100 ml.
Perfume, q.s.
Fluid white milk, suitable for hair, pH=7.5.

EXAMPLE XIX

Baby cream (W/O type)

100 g. contain:

| | G. |
|---|---|
| Dehymuls K (aliphatic mixed ester having high molecular weight, W/O type emulsifying base) | 25 |
| Cetiol (decyl oleate) | 10 |
| Paraffin oil | 5 |
| Bismuth subnitrate | 1 |
| Zinc oxide | 10 |
| Nipagine | 0.18 |
| Nipasol | 0.02 |
| 1-benzyl-indazole-3-yl-oxyacetic acid sodium salt | 1 |

Water, 47.80 g.
White mass of ointment-like consistency, pH=7.9.

EXAMPLE XX

Sunburn lotion 100 ml. contain:

| | G. |
|---|---|
| Glycerol | 5 |
| 95° alcohol | 20 |

|                                                      | G.    |
|------------------------------------------------------|-------|
| Dihydroxyacetone                                     | 2     |
| Water-soluble sunburn filter substance               | 2     |
| Nipagine                                             | 0.18  |
| Nipasol                                              | 0.02  |
| 1-benzyl-indazole-3-yl-oxyacetic acid sodium salt    | 1     |

Water to make 100 ml.
Perfume for sunburn lotion, q.s.
Clear solution, slightly yellow, pH=7.

EXAMPLE XXI

Sunburn cream (O/W type)

100 g. contain:

|                                                      | G.    |
|------------------------------------------------------|-------|
| Sorbitan monostearate                                | 0.6   |
| Polyoxyethylene sorbitan monostearate                | 4.4   |
| Cetyl stearyl alcohol                                | 5     |
| Cetyl alcohol                                        | 5     |
| Liquid paraffin                                      | 10    |
| Isopropyl myristate                                  | 2     |
| Glycerol                                             | 6     |
| Nipagine                                             | 0.18  |
| Nipasol                                              | 0.02  |
| 1-benzyl-indazole-3-yl-oxyacetic acid sodium salt    | 1     |
| Dihydroxyacetone                                     | 2     |
| Sunburn filter substance                             | 2     |

Water to make, 100 g.
Perfume for sunburn cream, q.s.
White cream, pH=6.9.

EXAMPLE XXII

Shampoo 100 g. contain:

|                                                                       | G.   |
|-----------------------------------------------------------------------|------|
| Extract N 40 Texapon (solution of 27–28% lauryl ether sodium sulfate), g. | 50   |
| Oleic acid diethanolamide, g.                                         | 5    |
| Undecylenic acid monoethanolamide, g.                                 | 2    |
| Hexachlorophene, g.                                                   | 1    |
| Isopropyl alcohol, ml.                                                | 2    |
| Citric acid, g.                                                       | 0.10 |
| 1-benzyl-indazole-3-yl-oxyacetic acid sodium salt, g.                 | 1    |

Water to make 100 g.
Perfume, q.s.
Viscous clear liquid, pH=6.9.

EXAMPLE XXIII

Toothpaste 100 g. contain:

|                                                      | G.     |
|------------------------------------------------------|--------|
| Sodium lauryl sulfonate                              | 2      |
| Sodium carboxymethylcellulose                        | 1      |
| Dicalcium phosphate                                  | 37.5   |
| Uncompressed aerosil                                 | 2.5    |
| Glycerol                                             | 30     |
| Sodium saccharin                                     | 0.0025 |
| Nipagine                                             | 0.18   |
| Nipasol                                              | 0.02   |
| 1-benzyl-indazole-3-yl-oxyacetic acid sodium salt    | 1      |

Water to make 100 g.
Toothpaste flavour q.s.
Smooth white paste containing no air, pH=6.9.

EXAMPLE XXIV

Deodorant (stick)

100 g. contain:

|                                           | G.   |
|-------------------------------------------|------|
| Eutanol G (2-octyl-dodecanol), g.         | 3    |
| Cetyl alcohol, g.                         | 2    |
| Glycerol, g.                              | 50   |
| Stearin, g.                               | 9.60 |
| Hexachlorophene, g.                       | 0.20 |
| 95% ethyl alcohol, ml.                    | 40   |
| Solution of 38% sodium hydrate, g.        | 4    |
| 1-benzyl-indazole-3-yl-oxyacetic acid sodium salt, g. | 1    |

Perfume, q.s.
Clear or slightly opalescent stick, pH=7.5.

For some of the pharmacological tests indicated, reference is made to the following literature:

Meier, R., Schuler, W. and Desaulles, P., Experimentia (Basel) 6, 469, 1950; Parrat, J. R. and West, B. G., Brit. J. Pharmacol. 13, 65, 1958; Siegmund, E., Cadmus, R. and Lu, G., Proc. Soc. Exp. Biol; (N.Y.), 95, 729, 1957; Winter, C. A., Risley, E. A. and Nuss, G. W., Proc. Soc. Exp. Biol.; (N.Y.), 111, 544, 1962.

What is claimed is:

1. A topical composition consisting essentially of an anti-inflammatory amount of up to about 3 percent by weight of an anti-inflammatory agent which is an indazole-3-oxyalkanoic acid having the formula

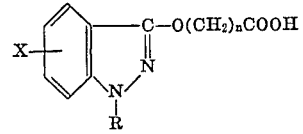

wherein,

X is selected from the group consisting of H, Cl, $OCH_3$, $NO_2$, $NH_2$ and $NHCOCH_3$, R is selected from the group consisting of H, phenyl, benzyl, and phenyl and benzyl substituted with a member selected from the group consisting of methyl, methoxyl, halogen, trifluoromethyl and dimethylsulfamido, $n$ is 1 or 2, in a pharmaceutically acceptable carrier.

2. The topical composition defined by claim 1, wherein the anti-inflammatory agent is a pharmacologically acceptable metal salt of said acid, the metal of which is selected from the group consisting of sodium, potassium, alkaline earth metal having an atomic number up to 20, aluminum, zinc, iron, manganese and cadmium.

3. The topical composition defined by claim 1, wherein the anti-inflammatory agent is the sodium salt of 1-benzyl-indazole-3-yl-oxyacetic acid.

4. The topical composition defined by claim 1, wherein the anti-inflammatory agent is an organic amine salt of said acid.

5. The topical composition defined by claim 1, wherein the anti-inflammatory agent is a morpholine salt of said acid.

6. The topical composition defined by claim 1, wherein the anti-inflammatory agent is a pharmacologically acceptable acid (A) addition salt of said acid, wherein the acid (A) is selected from the group consisting of hydrochloric, hydriodic, hydrobromic, phosphoric, metaphosphoric, nitric, sulfuric, tartaric, citric, malic, benzoic, glycollic, gluconic, gulonic, succinic, and p-toluene sulfonic acid, and wherein X is $NH_2$.

References Cited

UNITED STATES PATENTS

| 3,017,326 | 1/1962  | Cook   | 424—273    |
| 3,290,324 | 12/1966 | Lubowe | 424—273 XR |

ALBERT T. MEYERS, Primary Examiner

D. R. MAHANAND, Assistant Examiner

U.S. Cl. X.R.

252—89; 424—57, 60, 65, 365